US012422386B2

(12) United States Patent
Zhang et al.

(10) Patent No.: US 12,422,386 B2
(45) Date of Patent: Sep. 23, 2025

(54) PATTERN MEASUREMENT DEVICE

(71) Applicant: Hitachi High-Tech Corporation, Tokyo (JP)

(72) Inventors: Long Zhang, Tokyo (JP); Takuma Yamamoto, Tokyo (JP)

(73) Assignee: Hitachi High-Tech Corporation, Tokyo (JP)

(*) Notice: Subject to any disclaimer, the term of this patent is extended or adjusted under 35 U.S.C. 154(b) by 341 days.

(21) Appl. No.: 18/034,322

(22) PCT Filed: Dec. 16, 2020

(86) PCT No.: PCT/JP2020/046854
§ 371 (c)(1),
(2) Date: Apr. 27, 2023

(87) PCT Pub. No.: WO2022/130520
PCT Pub. Date: Jun. 23, 2022

(65) Prior Publication Data
US 2023/0375338 A1 Nov. 23, 2023

(51) Int. Cl.
G01N 23/2251 (2018.01)

(52) U.S. Cl.
CPC ... *G01N 23/2251* (2013.01); *G01N 2223/303* (2013.01); *G01N 2223/306* (2013.01);
(Continued)

(58) Field of Classification Search
USPC .......................................... 250/310
See application file for complete search history.

(56) References Cited

U.S. PATENT DOCUMENTS

| 6,259,960 B1* | 7/2001 | Inokuchi | G01N 21/9501 700/109 |
| 2005/0045821 A1* | 3/2005 | Noji | G01N 23/2204 250/311 |

(Continued)

FOREIGN PATENT DOCUMENTS

| JP | 2014-16174 A | 1/2014 |
| JP | 2018-45871 A | 3/2018 |

(Continued)

OTHER PUBLICATIONS

International Search Report (PCT/ISA/210) issued in PCT Application No. PCT/JP2020/046854 dated Feb. 9, 2021 with English translation (four (4) pages).

(Continued)

*Primary Examiner* — Kiet T Nguyen
(74) *Attorney, Agent, or Firm* — Crowell & Moring LLP

(57) ABSTRACT

The purpose of the present disclosure is to provide a pattern measurement device that can accurately measure positional deviation between a center of gravity of a top surface of a pattern and a center of gravity of a bottom surface of the pattern, even when an incidence angle of a charged particle beam varies for each irradiation position of the charged particle beam. The pattern measurement device according to the present disclosure acquires an angular deviation amount corresponding to coordinates in a visual field of a pattern in accordance with a relationship between the coordinates in the visual field of the pattern and an angular deviation amount of the charged particle beam, and acquires a positional deviation amount corresponding to the coordinates in the visual field of the pattern in accordance with a relationship between the angular deviation amount and the center of gravity positional deviation amount (see FIG. 3c).

13 Claims, 18 Drawing Sheets

(52) U.S. Cl.
CPC .............. *G01N 2223/6116* (2013.01); *G01N 2223/633* (2013.01)

(56) References Cited

U.S. PATENT DOCUMENTS

| | | |
|---|---|---|
| 2015/0285627 A1 | 10/2015 | Yamaguchi et al. |
| 2019/0005650 A1 | 1/2019 | Oya |
| 2019/0066969 A1 | 2/2019 | Bizen et al. |
| 2019/0362933 A1 | 11/2019 | Takagi et al. |
| 2020/0278615 A1 | 9/2020 | Yamamoto et al. |

FOREIGN PATENT DOCUMENTS

| | | |
|---|---|---|
| JP | 2019-11972 A | 1/2019 |
| JP | 2019-46567 A | 3/2019 |
| WO | WO 2019/073592 A1 | 4/2019 |

OTHER PUBLICATIONS

Japanese-language Written Opinion (PCT/ISA/237) issued in PCT Application No. PCT/JP2020/046854 dated Feb. 9, 2021 (three (3) pages.

* cited by examiner

+ TOP CENTER
× BOTTOM CENTER

FIG. 5C

| P.No | CENTER-OF-GRAVITY POSITIONAL DEVIATION_ BEFORE CORRECTION (nm) 61 | | PATTERN POSITION IN VISUAL FIELD_UPPER LAYER CENTER-OF-GRAVITY POSITION (nm) 62 | | BEAM INCLINATION CHANGE AMOUNT (deg) 63 | | CENTER-OF-GRAVITY POSITIONAL DEVIATION_ AFTER CORRECTION (nm) 64 | |
|---|---|---|---|---|---|---|---|---|
| | $OVL_{X\_BEFORE}$ | $OVL_{Y\_BEFORE}$ | $P_{tX}$ | $P_{tY}$ | $\Delta T_X$ | $\Delta T_Y$ | $OVL_{X\_AFTER}$ | $OVL_{Y\_AFTER}$ |
| 1 | $OVL_{X1\_BEFORE}$ | $OVL_{Y1\_BEFORE}$ | $P_{tX1}$ | $P_{tY1}$ | $\Delta T_{X1}$ | $\Delta T_{Y1}$ | $OVL_{X1\_AFTER}$ | $OVL_{Y1\_AFTER}$ |
| 2 | $OVL_{X2\_BEFORE}$ | $OVL_{Y2\_BEFORE}$ | $P_{tX2}$ | $P_{tY2}$ | $\Delta T_{X2}$ | $\Delta T_{Y2}$ | $OVL_{X2\_AFTER}$ | $OVL_{Y2\_AFTER}$ |
| 3 | $OVL_{X3\_BEFORE}$ | $OVL_{Y3\_BEFORE}$ | $P_{tX3}$ | $P_{tY3}$ | $\Delta T_{X3}$ | $\Delta T_{Y3}$ | $OVL_{X3\_AFTER}$ | $OVL_{Y3\_AFTER}$ |
| 4 | $OVL_{X4\_BEFORE}$ | $OVL_{Y4\_BEFORE}$ | $P_{tX4}$ | $P_{tY4}$ | $\Delta T_{X4}$ | $\Delta T_{Y4}$ | $OVL_{X4\_AFTER}$ | $OVL_{Y4\_AFTER}$ |
| AVERAGE VALUE | $Ave\_OVL_{X\_BEFORE}$ | $Ave\_OVL_{Y\_BEFORE}$ | $Ave\_P_{tX}$ | $Ave\_P_{tY}$ | $Ave\_\Delta T_X$ | $Ave\_\Delta T_Y$ | $Ave\_OVL_{X\_AFTER}$ | $Ave\_OVL_{Y\_AFTER}$ |

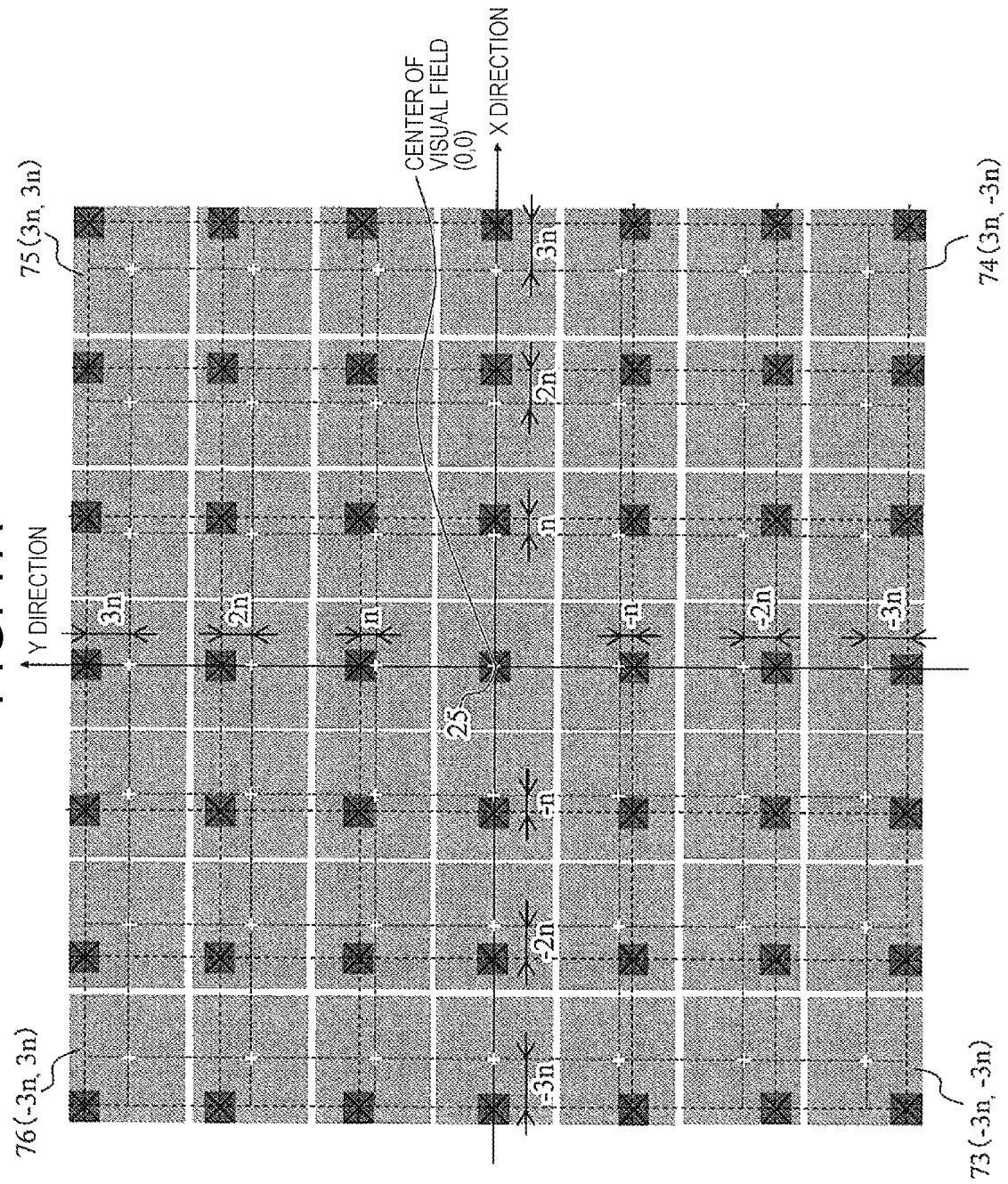

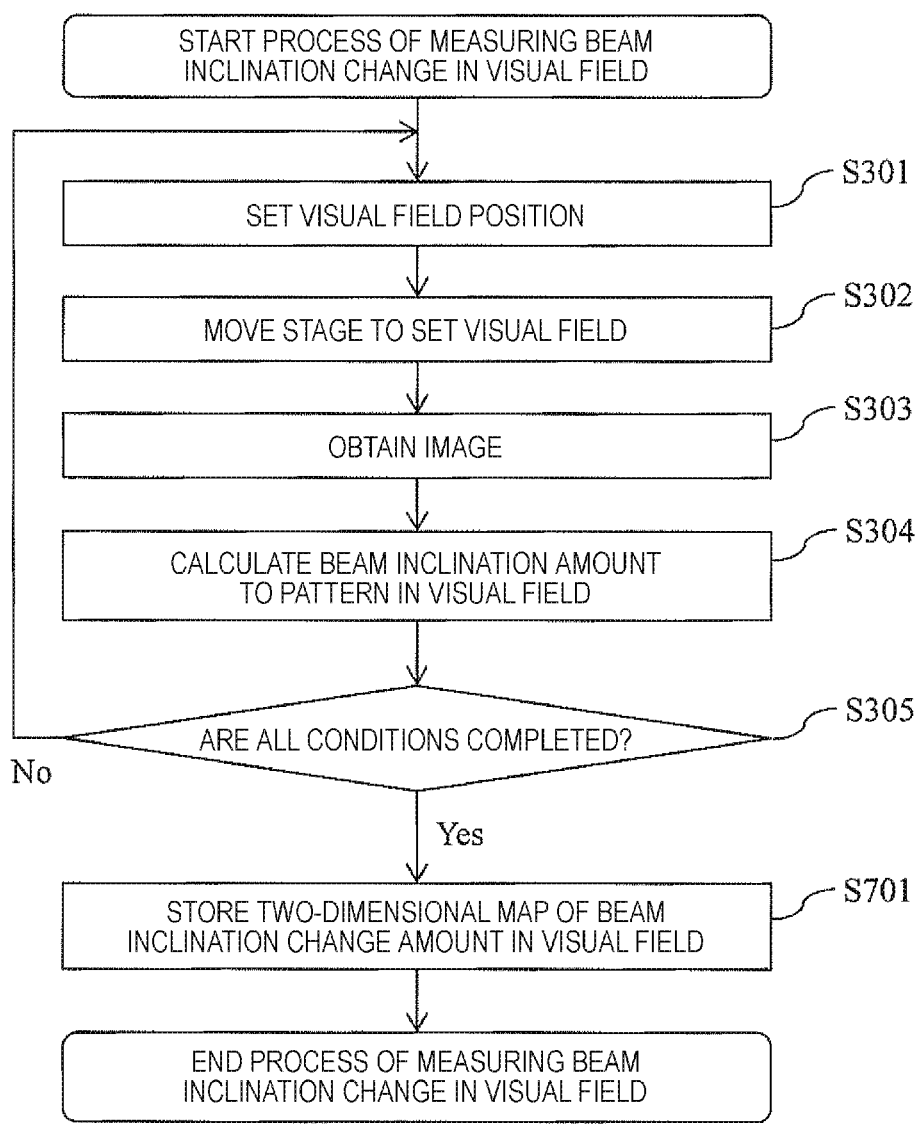

PATTERN MEASUREMENT DEVICE

TECHNICAL FIELD

The present disclosure relates to a pattern measurement device that measures a size of a pattern formed on a sample.

BACKGROUND ART

In the manufacturing process of semiconductor devices, qualities of a lithography process, an etching process, and other processes, the generation of foreign matter, and the like greatly affect the yield of the semiconductor devices. Therefore, in order to detect the occurrence of abnormalities and defects in the manufacturing process at an early stage or in advance, the pattern on a semiconductor wafer is measured and inspected in the manufacturing process. When highly accurate measurement is required, measurement using a scanning electron microscope (SEM) is widely used.

In recent years, while the progress of miniaturization has slowed down, the progress of high integration due to three-dimensionalization, as represented by 3D-NAND, is remarkable. There is an increasing need to measure pattern overlay deviation between different processes and pattern shapes of deep holes and grooves. For example, related arts such as depth measurement of the deep holes and deep grooves using an electron beam device, measurement of overlay deviation between different processes using signals from a plurality of detectors, and the like are reported.

The deep holes and deep grooves are processed by an etching process, but as the pattern to be processed becomes deeper, it becomes more difficult to process so that the bottom of the etching pattern matches the position of the lower layer pattern. As a result, it becomes important to measure the bottom dimension of the pattern to be processed, the center-of-gravity positional deviation (perpendicularity) with respect to the top, and the like within the wafer surface and to provide feedback to an etching device. For example, when the state of the etcher is not good, in some cases, processing uniformity deteriorates at the outer periphery of the wafer, and the pattern is processed with inclination. When the pattern is processed with the inclination, the positional deviation occurs between the center of gravity of the top surface and the center of gravity of the bottom surface of the pattern. By feeding this information back to the etching device, the processing uniformity can be improved.

In the case where the amount of the center-of-gravity positional deviation (perpendicularity) is measured, when irradiation electrons enter the sample surface from obliquely above (the electron beam does not enter the sample perpendicularly), an error occurs in the center-of-gravity positional deviation measurement value due to the inclination.

PTL 1 below discloses that "a pattern measurement device includes a computation device for measuring dimensions of patterns formed on a sample on the basis of a signal obtained by a charged particle beam device, in which the computation device includes a positional deviation amount calculation unit for calculating an positional deviation amount, in a direction parallel to a wafer surface, between two patterns at different heights on the basis of an image acquired at any beam tilt angle; a pattern inclination amount calculation unit for calculating a pattern inclination amount from the positional deviation amount by a relational expression between the positional deviation amount and the pattern inclination amount obtained in advance; and a beam tilt control amount calculation unit for controlling the beam tilt angle so as to match the pattern inclination amount, in which the pattern is measured by acquiring an image again at an angle set to a calculated beam tilt angle (see ABSTRACT)".

CITATION LIST

Patent Literature

PTL 1: WO2019/073592A

SUMMARY OF INVENTION

Technical Problem

In the related art such as PTL 1, when the electron incident angle with respect to the sample changes by deflecting the irradiation electrons in the observation visual field, the possibility of errors in a center-of-gravity positional deviation measurement value for each irradiation position due to the change in the incident angle is not fully examined. In other words, the possibility that the incident angle of the irradiation electrons differs for each position on the sample, and thus the center-of-gravity positional deviation measurement value varies for each position on the sample, is not sufficiently examined.

The present disclosure is conceived in view of the above technical problems, and an object of the present disclosure is to provide a pattern measurement device that can accurately measure the positional deviation between the center of gravity of the top surface of a pattern and the center of gravity of the bottom surface of the pattern, even when the incident angle of the charged particle beam is changed for each irradiation position of the charged particle beam.

Solution to Problem

According to the present disclosure, a pattern measurement device acquires an angular deviation amount corresponding to coordinates in a visual field of a pattern in accordance with a relationship between the coordinates in the visual field of the pattern and the angular deviation amount of a charged particle beam and acquires the positional deviation amount corresponding to the coordinates in the visual field of the pattern in accordance with a relationship between the angular deviation amount and a center-of-gravity positional deviation amount.

Advantageous Effects of Invention

According to a pattern measurement device according to the present disclosure, even when an incidence angle of a charged particle beam is changed for each irradiation position of the charged particle beam, positional deviation between a center of gravity of a top surface of a pattern and a center of gravity of a bottom surface of the pattern can be accurately measured.

BRIEF DESCRIPTION OF DRAWINGS

FIG. 5C illustrates an example of measurement results.

FIG. 7A illustrates an example in which pattern positions in the visual field are changed in various ways.

FIG. 7B is a flow chart showing a process of obtaining a two-dimensional map describing a relationship between a position in the visual field and the beam inclination change amount.

DESCRIPTION OF EMBODIMENTS

Embodiment 1

Figure 1:
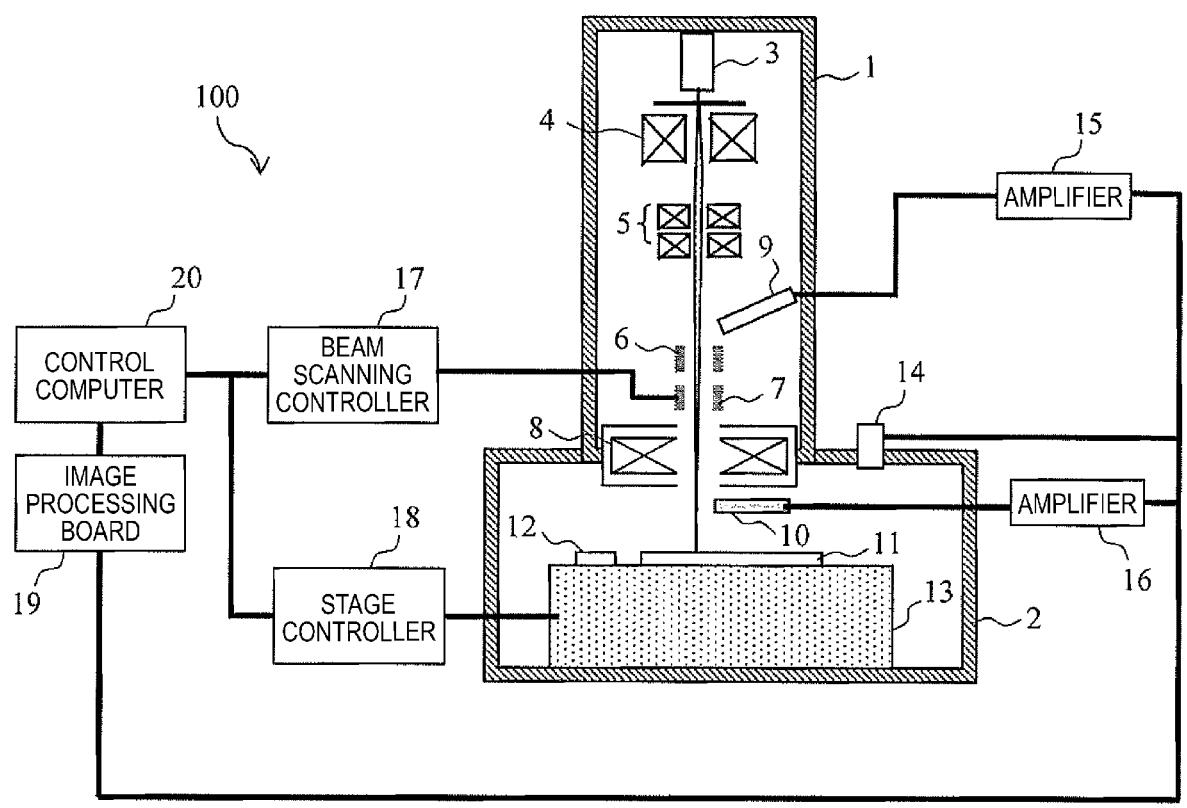
FIG. 1 is a configuration diagram of a pattern measurement device 100 according to Embodiment 1.

FIG. 1 is a configuration diagram of a pattern measurement device 100 according to Embodiment 1 of the present disclosure. The pattern measurement device 100 is a device that irradiates a sample (a wafer 11) with a primary electron beam to measure a size of a pattern formed on the sample. The pattern measurement device 100 includes a column 1 (electron optical system) and a sample chamber 2. The column 1 includes an electron gun 3, a condenser lens 4, an objective lens 8, a deflector 7, an aligner 5, a secondary electron detector 9, an EXB filter 6 (electromagnetic field orthogonal filter), and a backscattered electron detector 10.

The primary electron beams (irradiation electron) generated by the electron gun 3 are converged by the condenser lens 4 and the objective lens 8 for irradiating the wafer 11. The aligner 5 aligns positions where the primary electron beams are incident to the objective lens 8. The wafer 11 is scanned with the primary electron beams by the deflector 7. The deflector 7 scans the wafer 11 with the primary electron beams in accordance with a signal from a beam scanning controller 17. Secondary electrons obtained from the wafer 11 by the irradiation with the primary electron beams are directed to a direction of the secondary electron detector 9 by the EXB filter 6, and detected by the secondary electron detector 9. Backscattered electrons from the wafer 11 are detected by the backscattered electron detector 10. Together with the secondary electrons and the backscattered electrons, signals obtained from the sample by the irradiation with electron beams are collectively referred to as signal electrons. A charged particle optical system may include other lenses, electrodes, and detectors in addition to these and may partially differ from those described above, and the configuration of the charged particle optical system is not limited to this.

An XY stage 13 installed in the sample chamber 2 moves the wafer 11 to the column 1 in accordance with a signal from a stage controller 18. A standard sample 12 for beam calibration is mounted on the XY stage 13. The pattern measurement device 100 includes an optical microscope 14 for wafer alignment. The signals from the secondary electron detector 9 and the backscattered electron detector 10 are signal-converted by an amplifier 15 and an amplifier 16, transmitted to an image processing board 19, and imaged.

The operations of the entire pattern measurement device 100 are controlled by a control computer 20. The control computer 20 includes an input unit that enables a user to input instructions such as a mouse and a keyboard, a display unit that displays a screen such as a monitor, a storage unit such as a hard disk and memory, and the like.

The pattern measurement device 100 also includes a control unit that controls the operation of each part and an image generation unit that generates an image based on the signal output from the detector (not illustrated). The control unit and the image generation unit may be configured as hardware by a dedicated circuit board or may be configured by software executed by a computer. When configured by the hardware, the control unit and the image generation unit can be implemented by integrating a plurality of arithmetic units that execute processes on a wiring substrate, or in a semiconductor chip or a package. When configured by the software, the control unit and the image generation unit can be implemented by installing a general-purpose central processing unit (CPU) in a computer and executing a program for executing desired arithmetic processes. It is also possible to upgrade an existing device with a recording medium in which this program is recorded. These devices, circuits, and computers are connected to each other by a wired or wireless network, and data is transmitted and received as appropriate.

The incidence angle of the primary electron beam can be calibrated with respect to the XY stage 13 or the sample. For example, by deflecting electron beams with the deflector so that the standard sample 12 has a pattern etched into a pyramid shape (quadrangular cone shape), and the four faces of the pyramid appearing in an image have the same shape, an electron beam trajectory can be formed to match an ideal optic axis. Also, the electron beam trajectory can be adjusted so as to obtain a desired inclination angle based on geometric calculation of each face of the pyramid.

In the present embodiment, a relative angle between the ideal optic axis and a traveling direction of the primary electron beam is defined as a beam inclination angle, but a relative angle between the sample and the electron beam may be defined as the beam inclination angle. In a general electron beam measurement device (SEM), basically, the electron beam trajectory is set perpendicular (Z direction) to the movement trajectory (X direction and Y direction) of the XY stage. The Z direction is defined as zero degrees, and an inclination angle is indicated by plus or minus numbers in both the X and Y directions. Angles in all directions can be set by combining X and Y.

Hereinafter, with reference to FIGS. 2A to 2C, the cause of the generation of the beam inclination variation in the visual field and the influence of the beam inclination change on the measurement of a center-of-gravity positional deviation are described.

Figure 2A:
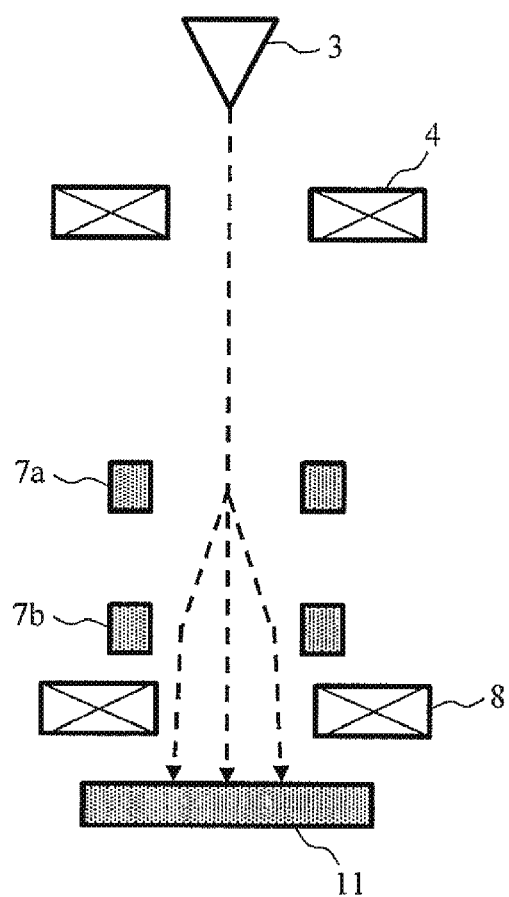
FIG. 2A illustrates how a deflector 7 deflects a primary electron beam.

FIG. 2A illustrates how the deflector 7 deflects the primary electron beam. In the deflector 7, the upper deflector 7a causes the electron beam to deviate from the ideal optic axis, and the lower deflector 7b deflects the electron beam ideally in a vertical direction. However, in practice, inclination variations are generated in the visual field due to the influence of the responsiveness of the deflector 7 and the like.

Figure 2B:
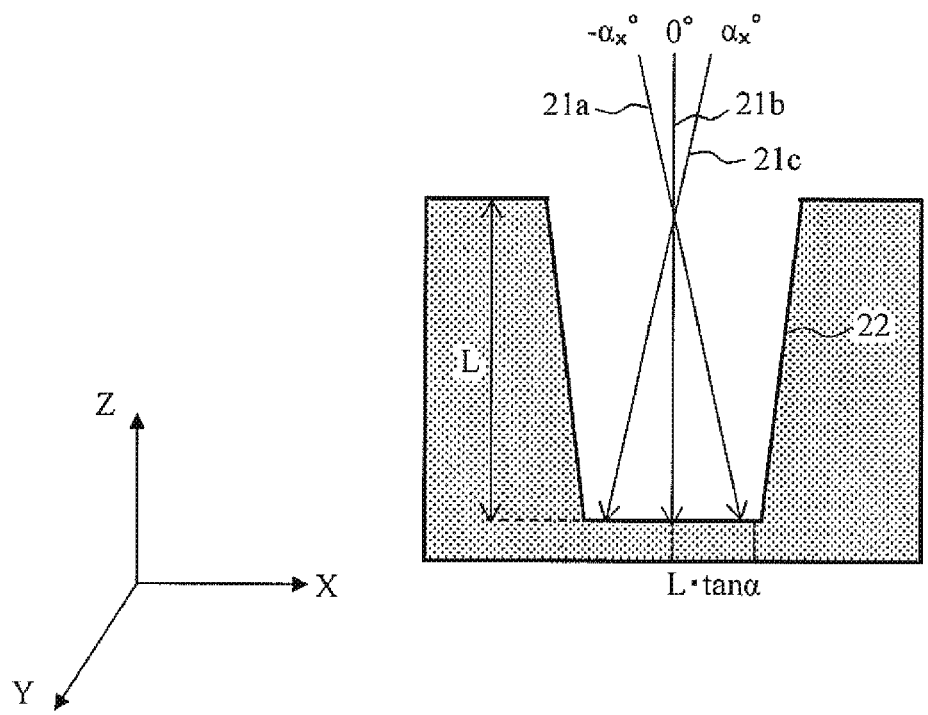
FIG. 2B is a side sectional view of a hole-shaped pattern.
Figure 2C:
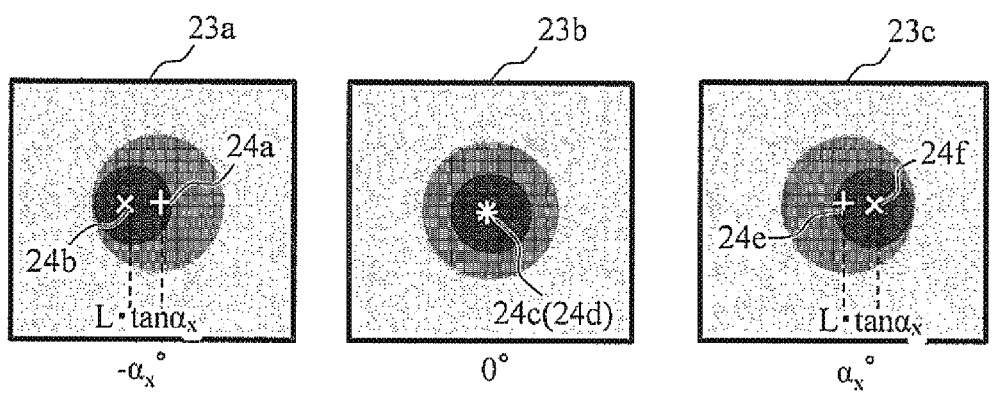
FIG. 2C is an SEM image captured with incident beams (21a to 21c) of FIG. 2B.

With reference to FIGS. 2B and 2C, the principle of generation of a measurement error in the center-of-gravity positional deviation amount due to the incident beam inclination change is described.

FIG. 2B is a side sectional view of a hole-shaped pattern. A hole 22 is etched in the vertical direction (Z axis) with respect to a sample surface, and the hole depth is L. When an incident beam 21b is perpendicular to the sample surface, a beam passing through the center of the top of the pattern reaches the center of the bottom portion. When an incident beam 21a is inclined to a −X side (incidence angle of $-\alpha_x°$), a beam passing through the center of the top reaches a position deviated by $L\cdot\tan\alpha_x$ in the +X direction with respect to the center of the bottom. When an incident beam 21c is inclined to the +X side (incidence angle of $+\alpha_x°$), a beam passing through the center of the top reaches a position deviated by $L\cdot\tan\alpha_x$ in a −X direction with respect to the center of the bottom.

FIG. 2C is an SEM image captured with the incident beams (21a to 21c) of FIG. 2B. The image is captured so that the center of the top of the hole pattern is the center of the image. When the incident angle of the incident beam 21b matches the pattern etching method (incidence angle of 0°), a center of gravity 24c of the top and a center of gravity 24d of the bottom match as in an SEM image 23b. When the incident beam 21a is inclined to the −X side (incidence angle of $-\alpha_x°$), a center of gravity 24b of the bottom deviates from a center of gravity 24a of the top by about $L\cdot\tan\alpha_x$ in the −X direction as in an SEM image 23a. When the incident beam 21c is inclined to the +X side (incidence angle of $+\alpha_x°$), a center of gravity 24f of the bottom deviates from a center of gravity 24e of the top by $L\cdot\tan\alpha_x$ in the +X direction as in an SEM image 23c. In this way, due to the incident beam inclination change, a measurement error is generated in a center-of-gravity positional deviation amount.

When the electron beam is deflected within the observation visual field, the incident angle of the beam changes depending on the scanning position in the visual field, and thus there is an error in the center-of-gravity positional deviation amount of the measured pattern. Therefore, it is necessary to correct the center-of-gravity positional deviation amount of the pattern.

When attempting to correct the center-of-gravity positional deviation amount of a pattern at any position in the visual field, the relationship between the beam inclination change amount in the visual field, the pattern position (a position of a center of gravity of an upper layer of the pattern), and the center-of-gravity positional deviation amount is measured to obtain a relational expression in advance. By using this relational expression, the center-of-gravity positional deviation correction amount is calculated from the beam inclination change amount to the pattern at any position in the visual field.

Figure 3A:
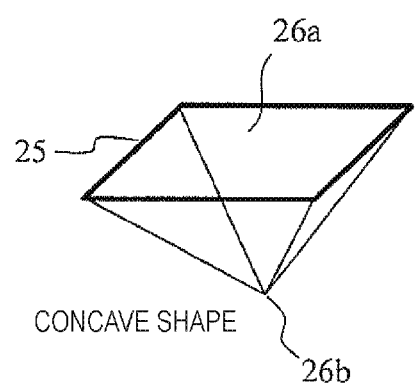
FIG. 3A is a perspective view illustrating an example of a standard sample 12.

FIG. 3A is a perspective view illustrating an example of the standard sample 12. In the present embodiment, by using the standard sample 12 in which a concave pyramid pattern 25 is formed illustrated in FIG. 3A, the beam inclination amount in the visual field is measured from the position of the center of gravity of a top surface 26a and a bottom position 26b of the pyramid.

Figure 3B:
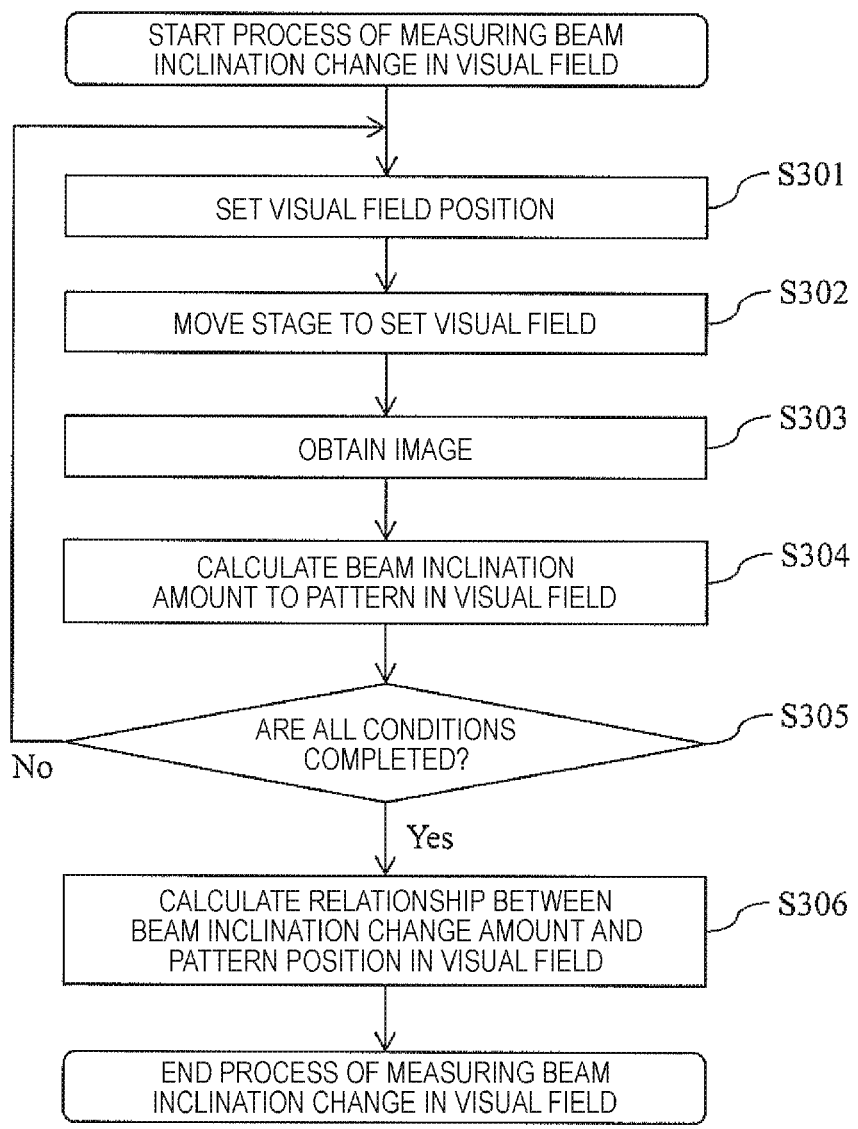
FIG. 3B is a flow chart showing a process of calculating a relational expression between a visual field position and a beam inclination change amount.

FIG. 3B is a flow chart showing a process of calculating a relational expression between a visual field position and a beam inclination change amount. A procedure for obtaining the relational expression between the visual field position and the beam inclination change amount is described in accordance with FIG. 3B.

(FIG. 3B: Steps S301 and S302)

The control computer 20 sets a visual field position on the sample (S301) and moves the XY stage 13 to the visual field position by the stage controller 18 (S302). An example of the visual field position is described below with reference to FIG. 3C.

(FIG. 3B: Steps S303 and S304)

The control computer 20 acquires a visual field image obtained by irradiating a visual field area with the primary electron beam (S303). The control computer 20 calculates the beam inclination amount at the visual field position by using the visual field image (S304). A specific method of calculating the beam inclination amount is described with reference to FIGS. 3C to 3G.

(FIG. 3B: Step S305)

The control computer 20 repeats S301 to S304 until all the conditions set in advance are completed (for example, until the visual field image is acquired for the entire area on the sample).

(FIG. 3B: Step S306)

The control computer 20 calculates a relational expression between the visual field position and the beam inclination change amount based on the relationship between the visual field image and the beam inclination amount. Examples of relational expressions are described again after FIGS. 3C to 3G.

Figure 3C:
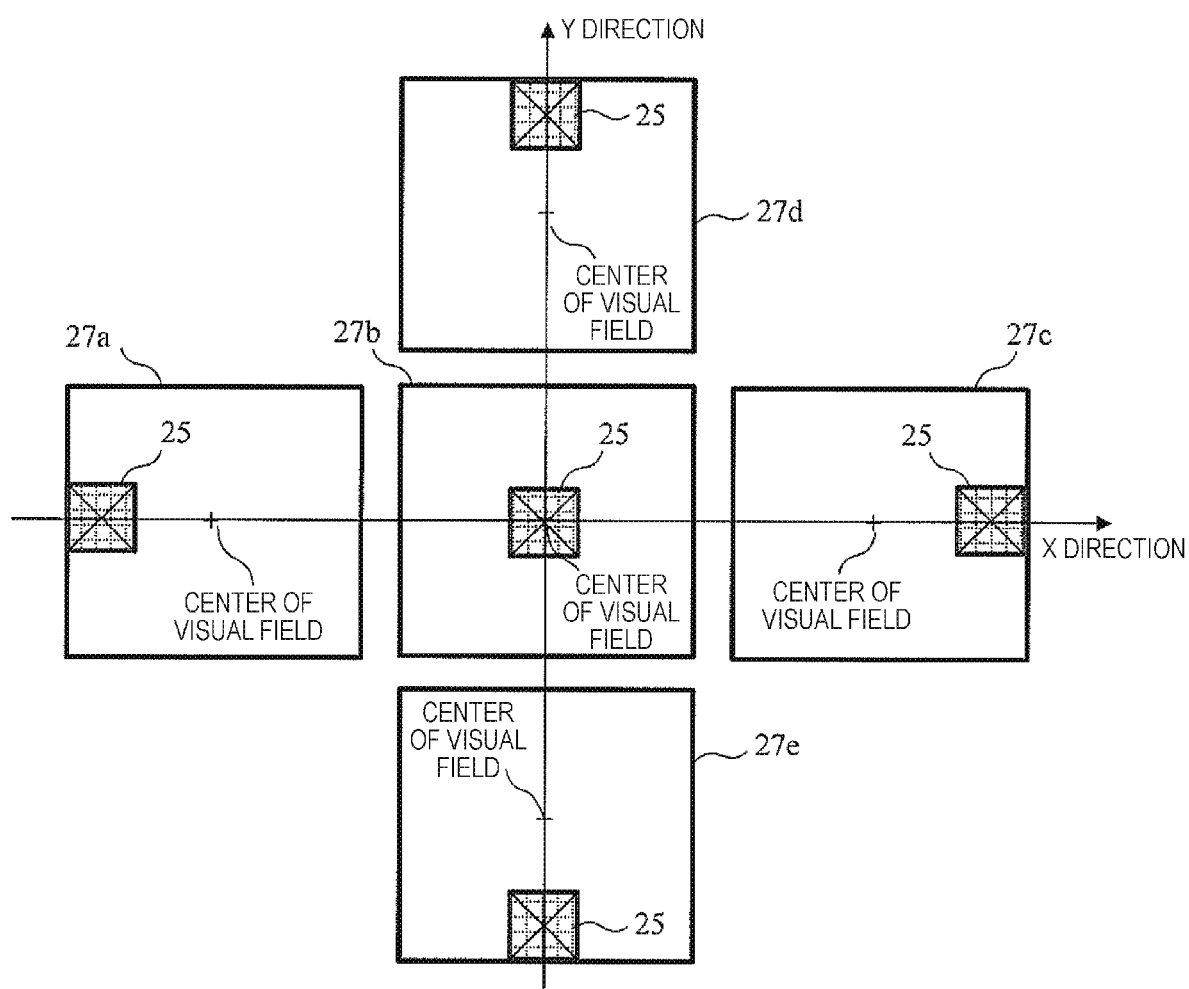
FIG. 3C is a diagram illustrating a procedure for obtaining a beam inclination amount.

FIG. 3C is a diagram illustrating a procedure for obtaining the beam inclination amount. By moving the stage, images are acquired while the positions (X direction and Y direction) of the same pyramid pattern 25 in the visual field are changed, and the beam inclination change amount at each visual field position is measured. A specific procedure for obtaining the beam inclination change amount at each visual field position is described below.

Figure 3D:
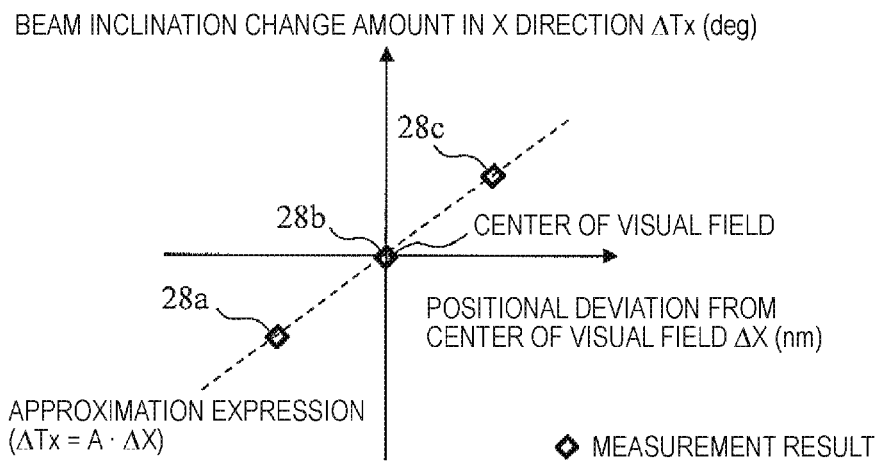
FIG. 3D is a diagram illustrating an inclination change amount in an X direction with respect to a positional deviation in the X direction from a center of the visual field.

FIG. 3D is a diagram illustrating an inclination change amount in the X direction ($\Delta T_X$) with respect to a positional deviation in the X direction from the center of the visual field. A procedure for calculating a coefficient of a beam inclination change in the X direction with respect to the visual field position in the X direction is described with reference to FIGS. 3C and 3D. An SEM image 27a of FIG. 3C is an image at the position where the pyramid pattern deviates from the center of the image in the −X direction. A point 28a in the graph of FIG. 3D is a plot of a positional deviation amount in a visual field of the pyramid pattern in the SEM image 27a with respect to the beam inclination amount in the X direction. In an SEM image 27b, a pyramid pattern becomes the center of the image. A point 28b is a plot of the beam inclination amount in the X direction with respect to the positional deviation amount in the visual field of the pyramid pattern in the SEM image 27b. An SEM image 27c is an image at a position where the pyramid pattern deviates from the center of the image in the +X direction. A point 28c is a plot of the beam inclination amount in the X direction with respect to the positional deviation amount in the visual field of the pyramid pattern in the SEM image 27c. The control computer 20 calculates a coefficient A of the beam inclination change (deg/nm) in the X direction by the positional deviation in the X direction from the center of the visual field by primary approximation with respect to the plots 28a to 28c.

Figure 3E:
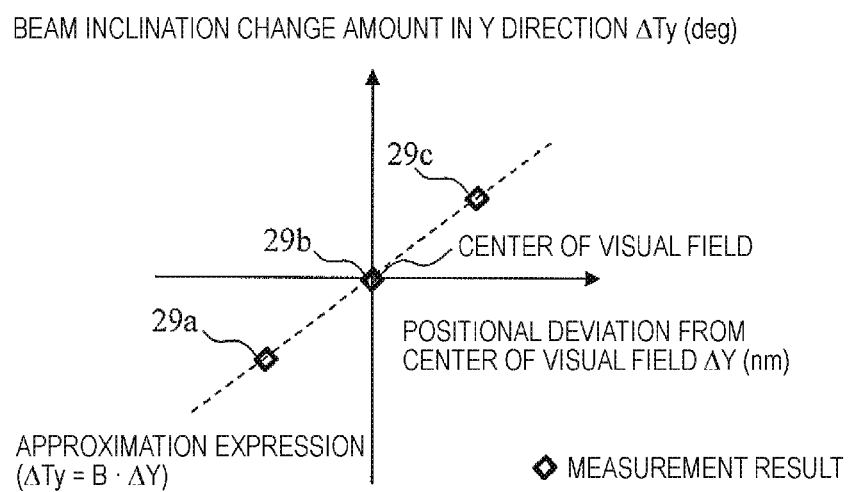
FIG. 3E is a diagram illustrating an inclination change amount in a Y direction with respect to a positional deviation in the Y direction from the center of the visual field.

FIG. 3E is a diagram illustrating an inclination change amount in the Y direction ($\Delta T_Y$) with respect to a positional deviation in the Y direction from the center of the visual field. A procedure for calculating a coefficient of the beam inclination change in the Y direction with respect to the visual field position in the Y direction is described with reference to FIGS. 3C and 3E. An SEM image 27e of FIG. 3C is an image at a position where a pyramid pattern deviates from the center of the image in a −Y direction. A point 29a in the graph of FIG. 3E is a plot of the beam inclination amount in the Y direction with respect to the positional deviation amount in the visual field of the pyramid pattern in the SEM image 27e. In the SEM image 27b, the pyramid pattern becomes the center of the image. A point 29b is a plot of the beam inclination amount in the Y direction with respect to the positional deviation amount in the visual field of the pyramid pattern in the SEM image 27b. An SEM image 27d is an image at a position where the pyramid pattern deviates from the center of the image in a +Y direction. A point 29c is a plot of the beam inclination amount in the Y direction with respect to the positional deviation amount in the visual field of the pyramid pattern in the SEM image 27d. The control computer 20 calculates the coefficient B of the beam inclination change (deg/nm) in the Y direction by the positional deviation in the Y direction from the center of the visual field by the primary approximation with respect to the plots 29a to 29c.

The actual electron beams are converged while rotating due to the magnetic field, and thus it is assumed that the beam inclination angle in the direction perpendicular to the direction of the positional deviation from the center of the visual field also changes. Therefore, as illustrated in FIGS. 3F and 3G, it is necessary to obtain a relational expression of the beam inclination angle change in the direction perpendicular to the direction of the positional deviation.

Figure 3F:
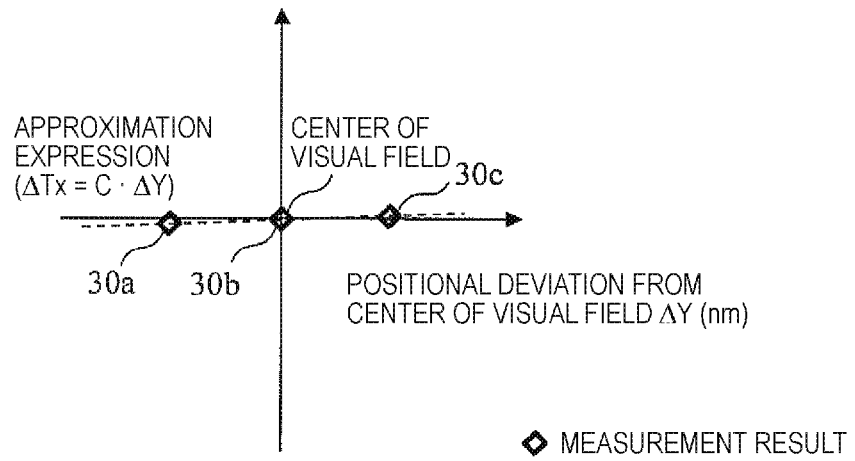
FIG. 3F is a diagram illustrating an inclination change amount in the X direction with respect to the positional deviation in the Y direction from the center of the visual field.

FIG. 3F is a diagram illustrating the inclination change amount in the X direction ($\Delta T_X$) with respect to a positional deviation in the Y direction from the center of the visual field. A procedure for calculating a coefficient of the beam inclination change in the X direction with respect to the visual field position in the Y direction is described with reference to FIGS. 3C and 3F. The SEM image 27e of FIG. 3C is an image at the position where a pyramid pattern is deviated from the center of the image in the −Y direction. A point 30a in the graph of FIG. 3F is a plot of the beam inclination amount in the X direction with respect to the positional deviation amount in the visual field of the pyramid pattern in the SEM image 27e. In the SEM image 27b, the pyramid pattern becomes the center of the image. A point 30b is a plot of the beam inclination amount in the X direction with respect to the positional deviation amount in the visual field of the pyramid pattern in the SEM image 27b. The SEM image 27d is an image at a position where the pyramid pattern deviates from the center of the image in the +Y direction. A point 30c is a plot of the beam inclination amount in the X direction with respect to the positional deviation amount in the visual field of the pyramid pattern in the SEM image 27d. The control computer 20 calculates the coefficient C of the beam inclination change in the X direction (deg/nm) by the positional deviation in the Y direction from the center of the visual field by the primary approximation with respect to the plots 30a to 30c.

Figure 3G:
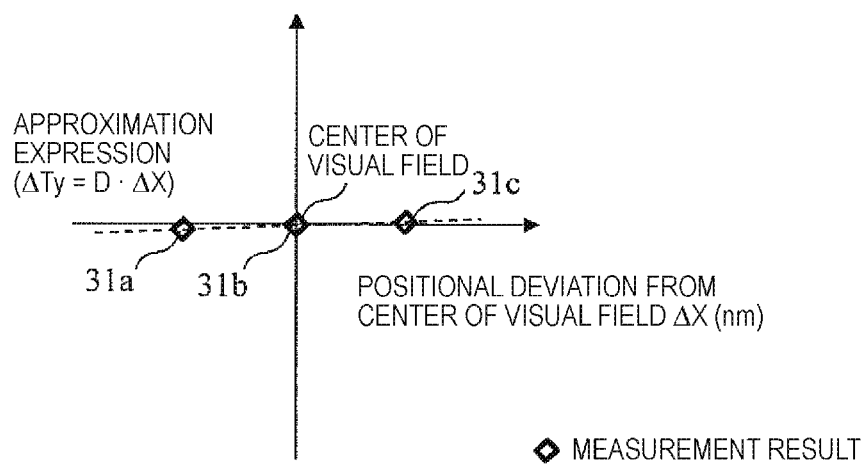
FIG. 3G is a diagram illustrating an inclination change amount in the Y direction with respect to the positional deviation in the X direction from the center of the visual field.

FIG. 3G is a diagram illustrating the inclination change amount in the Y direction ($\Delta T_Y$) with respect to a positional deviation in the X direction from the center of the visual field. A procedure for calculating a coefficient of the beam inclination change in the Y direction with respect to the visual field position in the X direction is described with reference to FIGS. 3c and 3g. The SEM image 27a of FIG. 3C is an image at a position where the pyramid pattern deviates from the center of the image in the −X direction. A point 31a in the graph of FIG. 3G is a plot of the beam inclination amount in the Y direction with respect to the positional deviation amount in the visual field of the pyramid pattern in the SEM image 27a. In the SEM image 27b, the pyramid pattern becomes the center of the image. A point 31b is a plot of the beam inclination amount in the Y direction with respect to the positional deviation amount in the visual field of the pyramid pattern in the SEM image 27b. The SEM image 27c is an image at the position where the pyramid pattern deviates from the center of the image in the +X direction. A point 31c is a plot of the beam inclination amount in the Y direction with respect to the positional deviation amount in the visual field of the pyramid pattern in the SEM image 27c. The control computer 20 calculates a coefficient D of the beam inclination change in the Y direction (deg/nm) by the positional deviation in the X direction from the center of the visual field by the primary approximation with respect to the plots 31a to 31c.

With respect to the coefficient, according to the present embodiment, a linear function is used as an approximation expression, but the format of the approximation expression is not limited to the linear function and may be a higher-order function (for example, a cubic expression).

The positional deviation between the pattern position in the visual field and the center of the visual field in the X direction is set as $\Delta X$, and the positional deviation between the pattern position in the visual field and the center of the visual field in the Y direction is set as $\Delta Y$. By the coefficients A, B, C, and D, beam inclination change amounts ($\Delta T_X$, $\Delta T_Y$) in the XY direction each can be calculated by using the linear expression below. The control computer 20 calculates the beam inclination change amount in accordance with the following expression and may be stored in a storage device.

$$\Delta T_X = A * \Delta X + C * \Delta Y$$

$$\Delta T_Y = B * \Delta Y + D * \Delta X$$

Figure 4A:
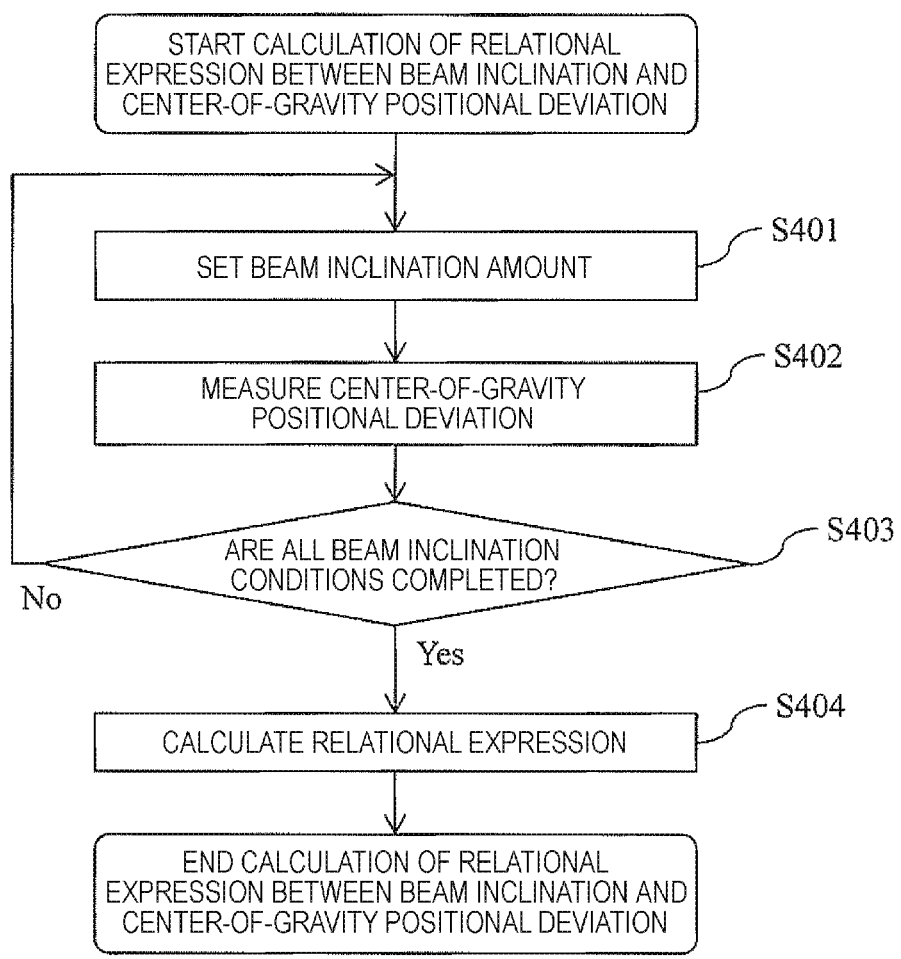
FIG. 4A is a flow chart showing a process of calculating a relational expression between a primary electron beam inclination change amount and a center-of-gravity positional deviation amount in a pattern at a specific position in the visual field.

FIG. 4A is a flow chart showing a process of calculating a relational expression between the primary electron beam inclination change amount and the center-of-gravity positional deviation amount in a pattern at a specific position in the visual field with respect to a wafer to be measured. This flow chart is executed for each position in the visual field (for example, for each pattern in the visual field) and results thereof are saved in a recipe. Each step of FIG. 4A is described below.

(FIG. 4A: Steps S401 to S402)

The control computer 20 sets the beam inclination amount of the primary electron beam with respect to the pattern at a specific position in the visual field (S401). The control computer 20 measures the center-of-gravity positional deviation amount by using the set beam inclination amount (S402). The center-of-gravity positional deviation amount can be measured by calculating a difference between the center of gravity of the top and the center of gravity of the bottom of the pattern of the wafer to be measured from the observation image of the pattern of the wafer to be measured.

(FIG. 4A: Step S403)

The control computer 20 repeats S401 to S402 until all conditions set in advance are completed (for example, beam inclination amount in a certain angular range).

(FIG. 4A: Step S404)

The control computer 20 calculates the relational expression between the beam inclination change amount and the center-of-gravity positional deviation amount based on a series of measurement results. An example of the relational expression is described below after FIGS. 4B to 4C.

Figure 4B:
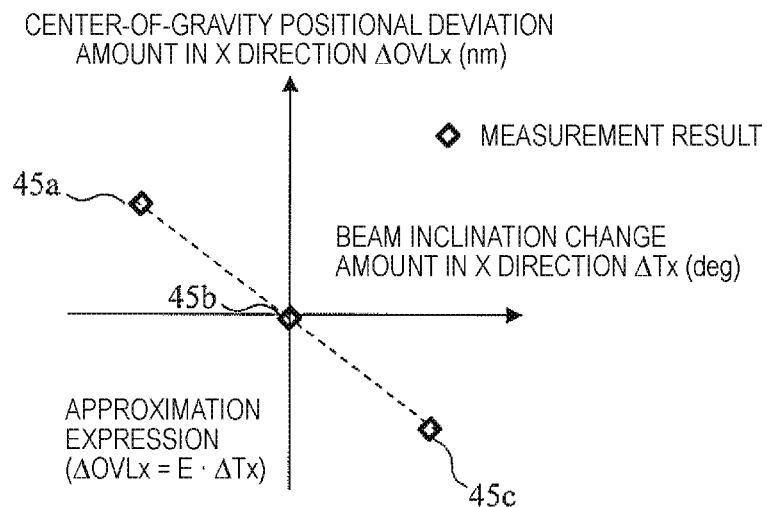
FIG. 4B is a diagram illustrating a center-of-gravity positional deviation amount in the X direction with respect to a beam inclination change amount in the X direction.

FIG. 4B is a diagram illustrating the center-of-gravity positional deviation amount in the X direction with respect to the beam inclination change amount in the X direction. A point 45a in the graph is a plot of the center-of-gravity positional deviation amount in the X direction to the inclination change amount when a beam is inclined in the −X direction from the vertical incidence (incidence angle of 0°). A point 45b is a plot of the center-of-gravity positional deviation amount in the X direction when the beam is vertically incident. A point 45c is a plot of the center-of-gravity positional deviation amount in the X direction to the inclination change amount when the beam is inclined in the +X direction from the vertical incidence (incidence angle of 0°). A coefficient E of the center-of-gravity positional deviation amount in the X direction (nm/deg) by the beam inclination change amount in the X direction is calculated by the primary approximation with respect to the plots 45a to 45c.

Figure 4C:
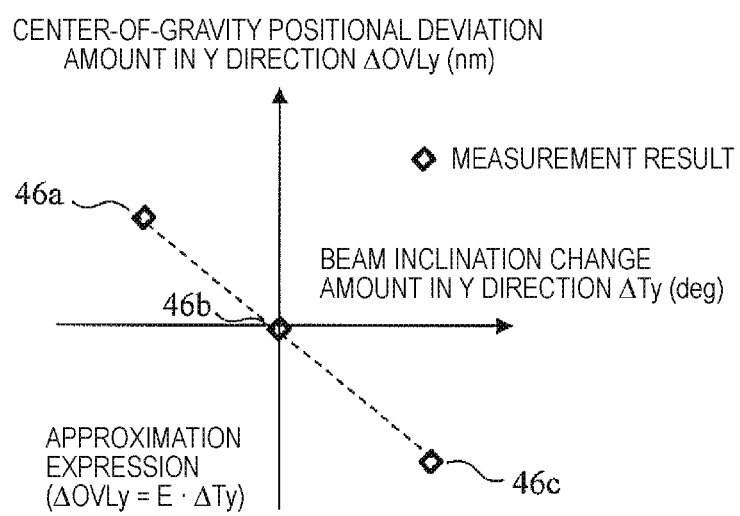
FIG. 4C is a diagram illustrating a center-of-gravity positional deviation amount in the Y direction with respect to a beam inclination change amount in the Y direction.

FIG. 4C is a diagram illustrating the center-of-gravity positional deviation amount in the Y direction with respect to the beam inclination change amount in the Y direction. A point 46a in the graph is a plot of the center-of-gravity positional deviation amount in the Y direction to the inclination change amount when the beam is inclined in the −Y direction from the vertical incidence (incidence angle of 0°). A point 46b is a plot of the center-of-gravity positional deviation amount in the Y direction when the beam is vertically incident. A point 46c is a plot of the center-of-gravity positional deviation amount in the Y direction to the inclination change amount when the beam is inclined in the +Y direction from the vertical incidence (incidence angle of 0°). A coefficient F of the center-of-gravity positional deviation amount in the Y direction (nm/deg) by the beam inclination change amount in the Y direction is calculated by the primary approximation with respect to the plots 46a to 46c.

With respect to the coefficient, according to the present embodiment, a linear function is used as an approximation expression, but the format of the approximation expression is not limited to the linear function and may be a higher-order function (for example, a cubic expression).

With the calculated coefficients E and F, when the incident beam inclination change amounts in the X and Y directions with respect to the pattern at any position in the visual field are $\Delta T_X$ and $\Delta T_Y$, respectively, center-of-gravity positional deviation change amounts $\Delta OVL_X$ and $\Delta OVL_Y$ in the X and Y directions of the pattern can be calculated by the following expressions.

$$\Delta OVL_X = E * \Delta T_X$$

$$\Delta OVL_Y = F * \Delta T_Y$$

Figure 5A:
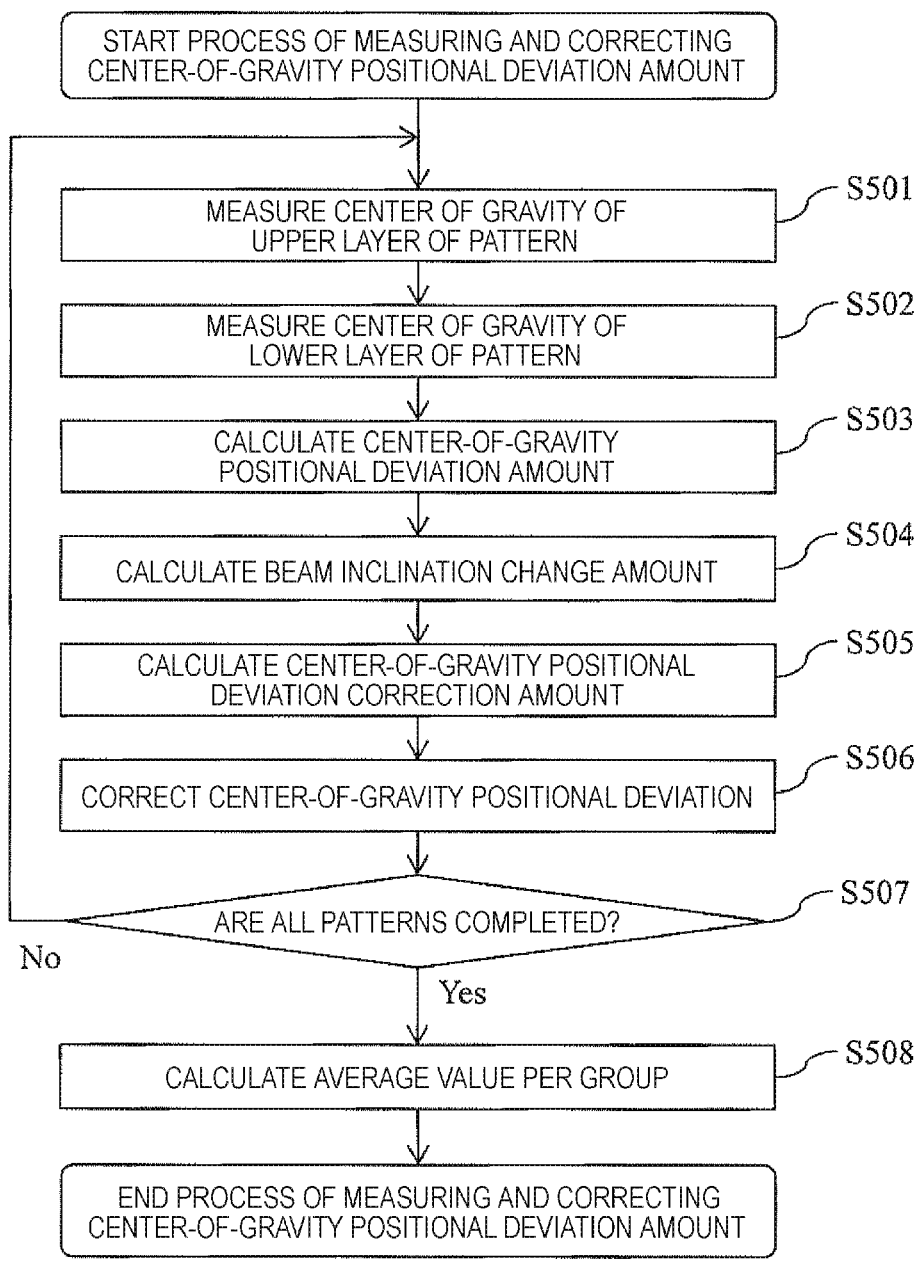
FIG. 5A is a flow chart showing a process of measuring the center-of-gravity positional deviation amount and correcting center-of-gravity positional deviation with respect to the pattern at the specific position in the visual field.

FIG. 5A is a flow chart showing a process of measuring a center-of-gravity positional deviation amount and correcting a center-of-gravity positional deviation with respect to a pattern at the specific position in the visual field. This flow chart is executed for each position in the visual field (for example, for each pattern in the visual field), and results thereof are stored. Each step of FIG. 5A is described below.

(FIG. 5A: Steps S501 to S503)

The control computer 20 measures the center of gravity of the upper layer of the pattern by using the observation image of the pattern (S501) and also measures the center of gravity of the lower layer of the pattern (S502). The control computer 20 obtains the difference between coordinates of these centers of gravity to calculate the center-of-gravity positional deviation amount before correction (S503).

(FIG. 5A: Step S504)

The control computer 20 calculates the beam inclination change amount by using the position of the pattern in the visual field (position of the center of gravity of the upper layer). As the calculation expression, the calculation expression described with reference to FIGS. 3C to 3G can be used. Specific examples of the actual calculation expression are described below.

(FIG. 5A: Step S505)

The control computer 20 calculates the center-of-gravity positional deviation change amount by using the calculated beam inclination change amount. As the calculation expression, the calculation expression described with reference to FIGS. 4A to 4C can be used. Specific examples of the actual calculation expression are described below.

(FIG. 5A: Step S506)

The control computer 20 corrects the center-of-gravity positional deviation amount calculated in S503 by using the calculated center-of-gravity positional deviation change amount.

(FIG. 5A: Step S507)

The control computer 20 repeats S501 to S506 until all conditions set in advance are completed (for example, center-of-gravity positional deviations for all patterns are corrected).

(FIG. 5A: Step S508)

The control computer 20 calculates the average value for each group from a series of measurement results. Examples of the group described herein are described below.

Figure 5B:
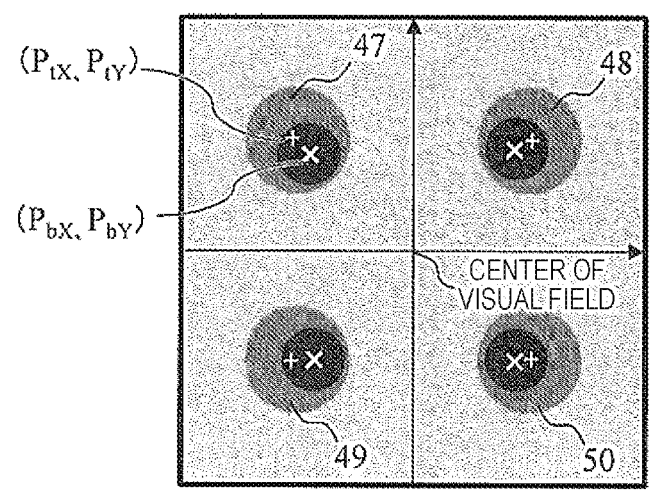
FIG. 5B is a schematic diagram showing calculation expressions in each step of FIG. 5A.

FIG. 5B is a schematic diagram showing calculation expressions in each step of FIG. 5A. In FIG. 5B, the coordinates of the center of the visual field are set as (0, 0). The positions of the centers of gravity of the upper and lower layers of the pattern measured in S501 to S502 with respect to a pattern 47 at any position in the visual field of FIG. 5B are $(P_{tX}, P_{tY})$ and $(P_{bX}, P_{bY})$, respectively. The center-of-gravity positional deviation amounts $OVL_X$ and $OVL_Y$ in the X and Y directions in S503 can be calculated by the following expressions.

$$OVL_X(\text{before correction}) = P_{bX} - P_{tX}$$

$$OVL_Y(\text{before correction}) = P_{bY} - P_{tY}$$

The beam inclination change amounts $\Delta T_X$ and $\Delta T_Y$ with respect to the position of the pattern 47 (position of the center of gravity of the upper layer) in the visual field in S504 can be calculated by the following expressions. The coefficients A, B, C, and D are results calculated by the process of FIG. 3B.

$$\Delta T_X = A^* P_{tX} + C^* P_{tY}$$

$$\Delta T_Y = B^* P_{tY} + D^* P_{tX}$$

The center-of-gravity positional deviation correction amounts $\Delta OVL_X$ and $\Delta OVL_Y$ with respect to the pattern 47 in S505 can be calculated by the following expressions. The coefficients E and F are results calculated by the process of FIG. 4A. Here, since it is assumed that a measurement error amount of the center-of-gravity positional deviation is cancelled by the correction, the coefficients are negative.

$$\Delta OVL_X = E^*(A^* P_{tX} + C^* P_{tY})$$

$$\Delta OVL_Y = F^*(B^* P_{tY} + D^* P_{tX})$$

The center-of-gravity positional deviation amount after correction with respect to the pattern 47 in S506 can be calculated by the following expressions.

$$OVL_X(\text{after correction}) = OVL_X(\text{before correction}) + \Delta OVL_X$$

$$OVL_Y(\text{after correction}) = OVL_Y(\text{before correction}) + \Delta OVL_Y$$

The center-of-gravity positional deviation amounts after correction with respect to all the patterns 47, 48, 49, and 50 in the visual field of FIG. 5B are measured. In S508, an average value of the center-of-gravity positional deviation amounts of all the patterns after correction is calculated.

FIG. 5C shows an example of the measurement results. For example, when the following values can be calculated: (a) center-of-gravity positional deviation amounts in the X and Y directions before correction in respective patterns in the visual field and an average value 61; (b) positions of respective patterns in the visual field (positions of the center of gravity of the upper layer) and an average value 62; (c) the beam inclination change amounts in the X and Y directions with respect to respective patterns in the visual field and an average value 63; and (d) center-of-gravity positional deviation amounts in the X and Y directions with respect to respective patterns in the visual field after correction and an average value 64.

Since the calculation results of the coefficients A, B, C, and D in the present embodiment differ depending on the setting conditions (optical conditions, scanning conditions, and the like), the coefficients A, B, C, and D for all setting conditions are calculated in advance, and results thereof are stored in the storage unit of the control computer 20 for each optical condition.

Figure 6:
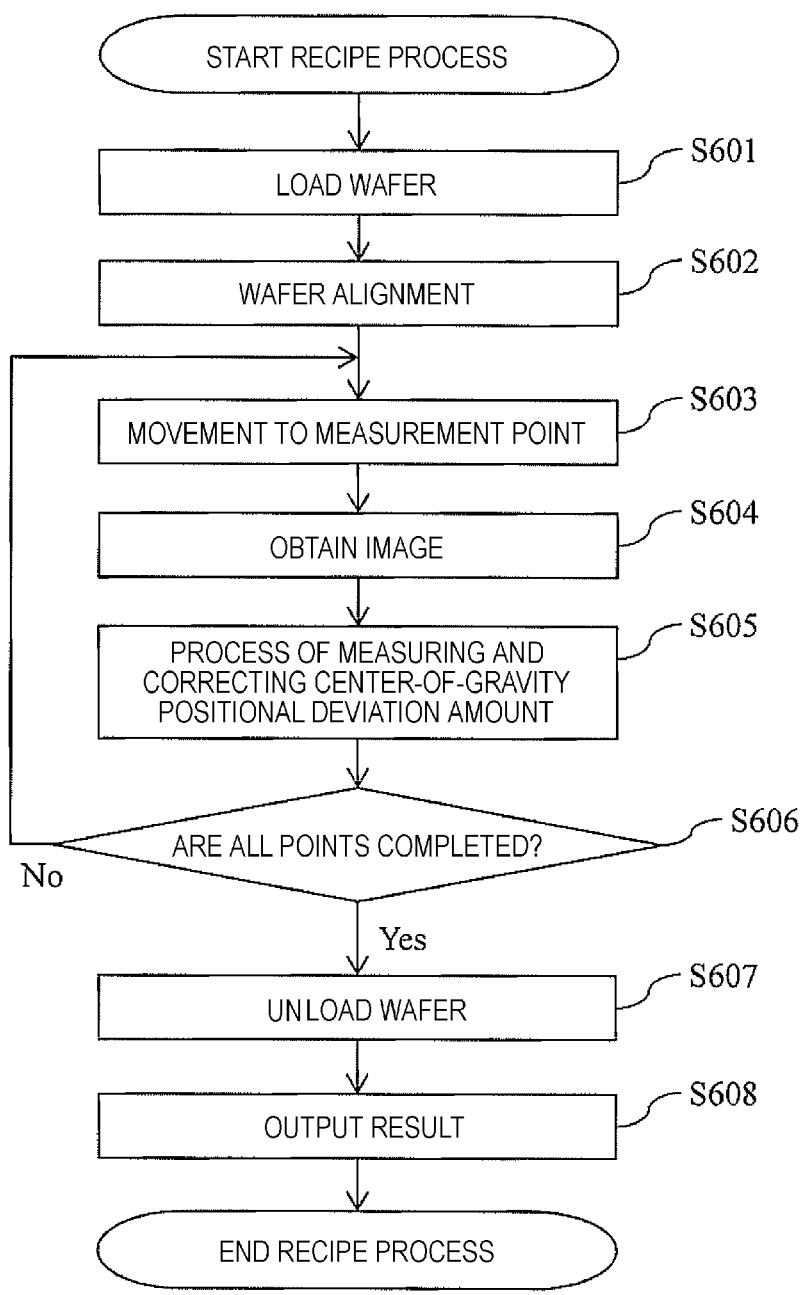
FIG. 6 is a flow chart showing a recipe process performed by the pattern measurement device 100.

FIG. 6 is a flow chart showing a recipe process performed by the pattern measurement device 100. Each step of FIG. 6 is described below.

(FIG. 6: Step S601)

When the recipe starts, the control computer 20 loads the selected wafer 11 into the sample chamber 2 (S601). The control computer 20 performs alignment by using an optical microscope and an SEM image (S602).

(FIG. 6: Steps S603 to S605)

The control computer 20 controls the XY stage 13 to move the wafer 11 to the measurement points registered in the recipe (S603). The image processing board 19 acquires the SEM image in accordance with a certain condition registered in the recipe (S604). The control computer 20 performs the process of measuring and correcting the center-of-gravity positional deviation amounts in accordance with the procedures and the calculation expressions described up to FIG. 5B (S605).

(FIG. 6: Step S606)

The control computer 20 repeats S603 to S605 for all measurement points among measurement points defined in the recipe.

(FIG. 6: Steps S607 to S608)

The control computer 20 unloads the wafer 11 (S607) and outputs the recipe execution result (S608).

Embodiment 2

In Embodiment 1, the calculation of the beam inclination change amounts in the visual field by using the primary approximation expression in S306 of FIG. 3C is described. In contrast, it is considered that, if approximation by using a linear expression is not appropriate due to the influence of scan response delay, and the like, it is effective to use a two-dimensional lookup table to represent the relationship between the position in the visual field and the beam inclination change amount. Therefore, in Embodiment 2 of the present invention, a configuration example in which the relationship between the position in the visual field and the beam inclination change amount is described with reference to a two-dimensional data table is described. Other configurations of the pattern measurement device 100 are the same as those of Embodiment 1, so the two-dimensional data table describing the relationship between the position in the visual field and the beam inclination change amount is mainly described below.

FIG. 7A illustrates an example in which the pattern positions in the visual field are changed in various ways. In order to obtain the relationship between the position in the visual field and the beam inclination change amount, the pyramid pattern 25 is used to measure the beam inclination amount for each pattern position in the visual field. In the beam inclination amount measurement, as illustrated in FIG. 7A, images are acquired while positions of the same pyramid pattern 25 are shifted from the center of the visual field in the XY directions by a distance n at a time by moving the XY stage 13, and the beam inclination change amount at each visual field position is measured. When the coordinates of the center of the visual field position are (0, 0), the coordinates of each visual field position are determined by the movement amount and movement direction from the center of the visual field. For example, the coordinates of visual field positions 73, 74, 75, and 76 after being shifted from the center of the visual field by 3n at a time in the XY directions become (−3n, −3n), (3n, −3n), (3n, 3n), and (−3n, 3n), respectively.

FIG. 7B is a flow chart showing a process of obtaining a two-dimensional map describing a relationship between the position in the visual field and the beam inclination change amount. S301 to S305 are the same as in FIG. 3B, and S701 is performed instead of S306. In S701, the control computer 20 stores, in the storage device, a two-dimensional data table describing the beam inclination change amount for each pattern position (lattice point coordinates such as (n, n) in FIG. 7A) in the visual field.

Figure 7C:
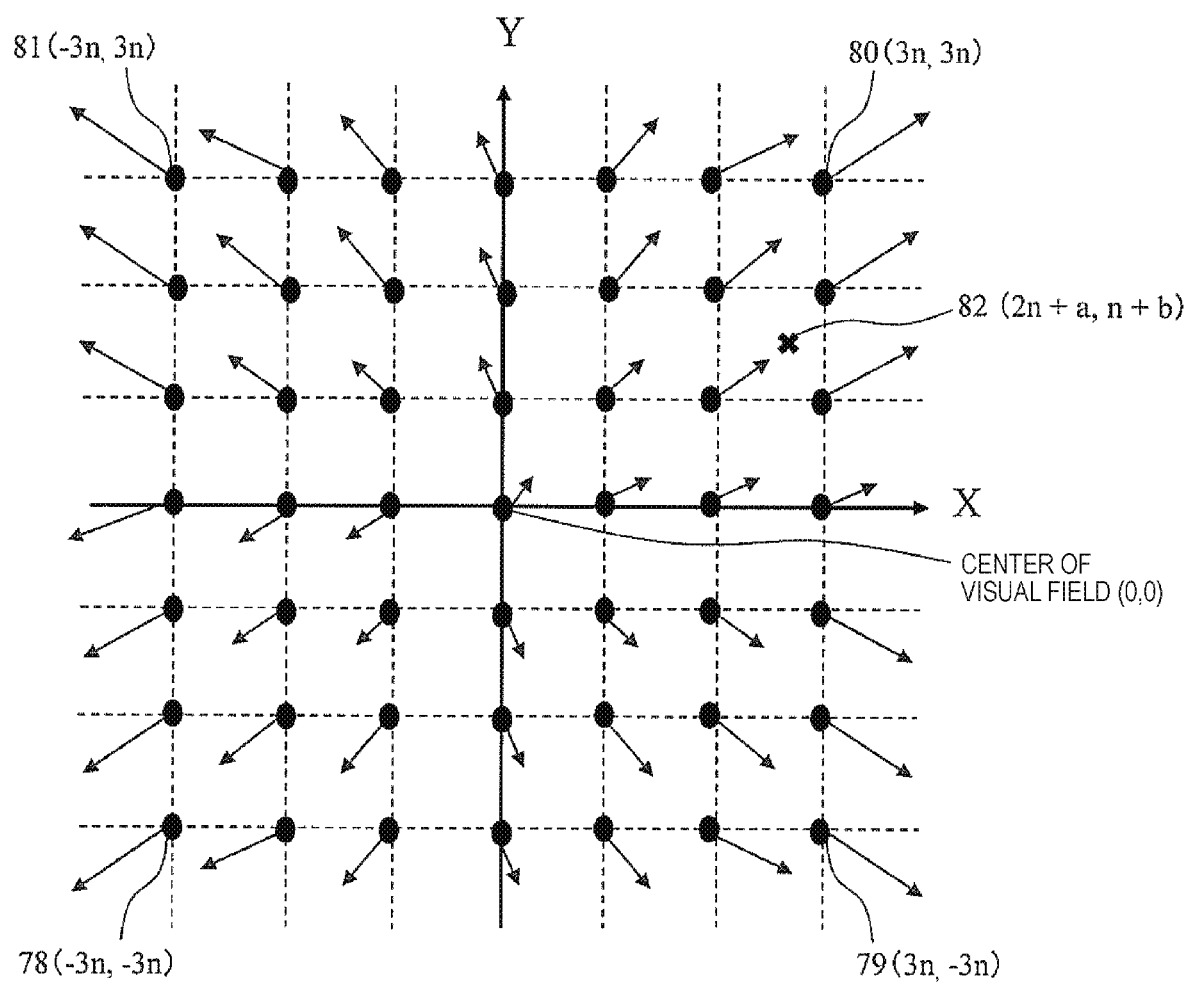
FIG. 7C is a schematic diagram illustrating the two-dimensional map obtained by the measurement process of FIG. 7B at each visual field position of FIG. 7A.

FIG. 7C is a schematic diagram illustrating a two-dimensional map obtained by the measurement process of FIG. 7B at each visual field position of FIG. 7A. The beam inclination change amount at each position is schematically indicated by an arrow. For example, the arrows of the beam inclination change amounts for the visual field positions 73, 74, 75, and 76 become 78, 79, 80, and 81, respectively.

The two-dimensional map in FIG. 7C describes the amount of beam inclination angle change for each grid point in the visual field. The beam inclination change amount at intermediate coordinates between lattice points can be proportionally calculated by proportionally allocating beam inclination change amounts at four surrounding lattice points. A calculation procedure is described with reference to an example of calculating the beam inclination change amounts ($\Delta T_X$, $\Delta T_Y$) for a position 82 (2n+a, n+b) in FIG. 7C.

Figure 7D:
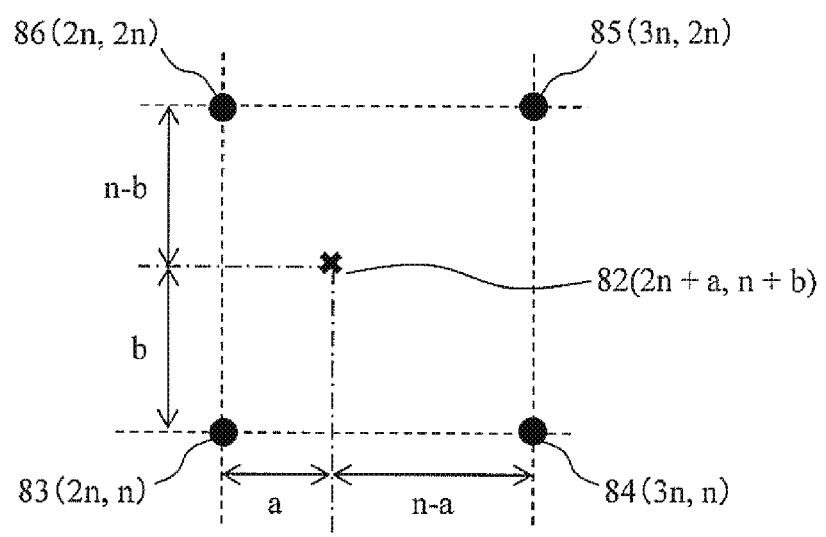
FIG. 7D is a diagram showing a procedure for calculating a beam inclination change amount at a position 82.

FIG. 7D is a diagram showing a procedure for calculating a beam inclination change amount at a position 82. By using beam inclination change amounts of four lattice points 83, 84, 85, and 86 around the position 82, the beam inclination change amounts at the position 82 are calculated by the calculation expression below. ($\Delta T_{X1}$, $\Delta T_{Y1}$), ($\Delta T_{X2}$, $\Delta T_{Y2}$), ($\Delta T_{X3}$, $\Delta T_{Y3}$), and ($\Delta T_{X4}$, $\Delta T_{Y4}$) are beam inclination change amounts of the lattice points 83, 84, 85, and 86, respectively.

$$\Delta T_X = \{\Delta T_{X1}*(1-a/n) + \Delta T_{X2}*a/n\}*(1-b/n) + \{\Delta T_{X3}*(1-a/n) + \Delta T_{X4}*a/n\}*b/n$$

$$\Delta T_Y = \{\Delta T_{Y1}*(1-a/n) + \Delta T_{Y2}*a/n\}*(1-b/n) + \{\Delta T_{Y3}*(1-a/n) + \Delta T_{Y4}*a/n\}*b/n$$

With Respect to Modification of the Present Disclosure

The present disclosure is not limited to the above-described embodiments and includes various modifications. For example, the embodiments described above are described in detail in order to explain the present disclosure in an easy-to-understand manner and do not necessarily include all the configurations described. Also, a part of an embodiment can be replaced with the configuration of another embodiment, and the configuration of another embodiment can be added to the configuration of an embodiment. Moreover, a part of the configuration of each embodiment can be added, deleted, or replaced with the configuration of another embodiment.

In the above embodiments, measurement of the size of a pattern on a sample by using a charged particle beam device is described. The charged particle beam device broadly includes a device that captures an image of a sample using a charged particle beam. Examples of charged particle beam devices include inspection devices, review devices, and pattern measurement devices using scanning electron microscopes. The present disclosure can also be applied to general-purpose scanning electron microscopes, and sample processing devices or sample analysis devices equipped with scanning electron microscopes. The charged particle beam device also includes a system in which a plurality of charged particle beam devices are connected to each other via a network.

In the above embodiments, the example in which the "sample" is a semiconductor wafer on which patterns are formed is described, but the embodiments are not limited to the example. Also, the "pattern" is not limited to a hole pattern, and the present disclosure can be applied to any pattern that can cause positional deviation between the center of gravity of the top surface and the center of gravity of the bottom surface.

The relational expression described in Embodiment 1 and the two-dimensional map described in Embodiment 2 may be created and stored for each optical condition and scanning condition (for example, the movement speed of the beam irradiation position) of the charged particle beam. This is because the beam inclination change amount at a position in the visual field may differ for each of these conditions. In this case, relational expressions or two-dimensional maps are obtained in advance for all conditions, and results thereof are stored in the storage device of the control computer 20.

REFERENCE SIGNS LIST

100: pattern measurement device
1: column
2: sample chamber
3: electron gun
4: condenser lens
5: aligner
6: EXB filter
7: deflector
8: objective lens
9: secondary electron detector
10: backscattered electron detector
11: wafer
12: standard sample
13: XY stage
14: optical microscope
15, 16: amplifier
17: beam scanning controller
18: stage controller
19: image processing board
20: control computer

The invention claimed is:

1. A pattern measurement device that measures a size of a pattern formed on a sample, the device comprising:
   a computer system that calculates a positional deviation amount between a center of gravity of a top surface of the pattern and a center of gravity of a bottom surface of the pattern by using an observation image obtained by irradiating the sample with a charged particle beam; and
   a storage unit that stores relationship data describing a first relationship between an angular deviation amount from an optic axis of an irradiation angle of the charged particle beam and the positional deviation amount, characterized in that
   the relationship data further describes a second relationship between coordinates in a visual field of the pattern and the angular deviation amount,
   the computer system refers to the relationship data using the coordinates in the visual field of the pattern to acquire the angular deviation amount corresponding to the coordinates in the visual field of the pattern,
   the computer system refers to the relationship data using the acquired angular deviation amount to acquire the positional deviation amount corresponding to the coordinates in the visual field of the pattern, and
   the computer system uses the acquired positional deviation amount to correct a measurement positional deviation between the center of gravity of the top surface of the pattern and the center of gravity of the bottom surface of the pattern.

2. The pattern measurement device according to claim 1, wherein
   the second relationship describes a relationship between coordinates of the center of gravity of the top surface of the pattern in a first direction and the angular deviation amount in the first direction, the second relationship also describes a relationship between coordinates of the center of gravity of the top surface of the pattern in a second direction perpendicular to the first direction and the angular deviation amount in the second direction, and the computer system refers to the second relationship using the coordinates of the pattern in the visual field in the first direction and the second direction to acquire the angular deviation amounts in the first direction and the second direction, respectively.

3. The pattern measurement device according to claim 2, wherein the second relationship further describes a relationship between the coordinates of the center of gravity of the top surface of the pattern in the second direction and the angular deviation amount in the first direction, the second relationship also describes a relationship between the coordinates in the center of gravity of the top surface of the pattern in the first direction and the angular deviation amount in the second direction, and the computer system refers to the second relationship by using the coordinates in the visual field of the pattern in the first direction and the second direction to acquire the angular deviation amounts of the first direction and the second direction, respectively.

4. The pattern measurement device according to claim 3, wherein the second relationship describes a sum of the angular deviation amount in the first direction, which is caused by a deviation amount in the first direction from center coordinates of an observation visual field to the center of gravity of the top surface of the pattern, and the angular deviation amount in the first direction, which is caused by a deviation amount in the second direction from the center coordinates of the observation visual field to the center of gravity of the top surface of the pattern, as the angular deviation amount in the first direction, and the second relationship describes a sum of the angular deviation amount in the second direction, which is caused by the deviation amount in the second direction from the center coordinates of the observation visual field to the center of gravity of the top surface of the pattern, and the angular deviation amount in the second direction, which is caused by the deviation amount in the first direction from the center coordinates of the observation visual field to the center of gravity of the top surface of the pattern, as the angular deviation amount in the second direction.

5. The pattern measurement device according to claim 2, wherein the first relationship describes a relationship between the angular deviation amount in the first direction and the positional deviation amount in the first direction, the first relationship also describes a relationship between the angular deviation amount in the second direction and the positional deviation amount in the second direction, and the computer system refers to the first relationship by using the angular deviation amount in the first direction and the second direction to acquire the positional deviation amount in the first direction and the second direction.

6. The pattern measurement device according to claim 2, wherein the computer system performs a step of acquiring the observation image of the sample of which a shape and a size are known for each center coordinate, while changing center coordinates of the observation visual field, a step of calculating a deviation amount between the center of gravity of the top surface and the center of gravity of the bottom surface by using the observation image to calculate the angular deviation amount for each set of the center coordinates, and a step of calculating the second relationship by using the angular deviation amount for each center coordinate.

7. The pattern measurement device according to claim 6, wherein the computer system moves a stage on which the sample is placed to change the center coordinates of the observation visual field, or changes an irradiation position of the charged particle beam to change the center coordinates of the observation visual field.

8. The pattern measurement device according to claim 1, wherein the computer system performs a step of acquiring an observation image of a pattern of a wafer to be measured for each inclination angle while changing an inclination angle of the charged particle beam, a step of calculating a deviation amount between the center of gravity of the top surface and the center of gravity of the bottom surface by using the observation image to calculate the positional deviation amount for each inclination angle, and a step of calculating the first relationship by using the positional deviation amount for each inclination angle.

9. The pattern measurement device according to claim 1, wherein the computer system outputs at least any of the positional deviation amount for each pattern, a correction amount in the correction for each pattern, and an average value of the correction amount for each type of the pattern.

10. The pattern measurement device according to claim 1, wherein the relationship data describes the angular deviation amount for each lattice point in the visual field, and the computer system refers to the relationship data to acquire the angular deviation amount for each lattice point.

11. The pattern measurement device according to claim 10, wherein the computer system calculates the angular deviation amounts in intermediate coordinates surrounded by four lattice points by proportionally allocating the angular deviation amounts at the four lattice points in accordance with distances between the intermediate coordinates and the four lattice points.

12. The pattern measurement device according to claim 1, wherein the relationship data describes the first relationship and the second relationship for each optical condition of the charged particle beam device that deflects the charged particle beam, and the computer system performs correction by using the first relationship and the second relationship corresponding to the optical condition.

13. The pattern measurement device according to claim 1, wherein the relationship data describes the first relationship and the second relationship for each irradiation condition of the charged particle beam, and the computer system performs correction by using the first relationship and the second relationship corresponding to the irradiation condition.

\* \* \* \* \*